US012675328B1

(12) United States Patent
Abraitis et al.

(10) Patent No.: US 12,675,328 B1
(45) Date of Patent: Jul. 7, 2026

(54) KERNEL-LEVEL RESOURCE ACTIVATION FOR PROCESS MANAGEMENT

(71) Applicant: HOSTINGER operations, UAB, Vilnius (LT)

(72) Inventors: Donatas Abraitis, Kaunas (LT); Antanas Patasius, Kaunas (LT)

(73) Assignee: HOSTINGER operations, UAB, Vilnius (LT)

( * ) Notice: Subject to any disclaimer, the term of this patent is extended or adjusted under 35 U.S.C. 154(b) by 0 days.

(21) Appl. No.: 19/346,871

(22) Filed: Oct. 1, 2025

(51) Int. Cl.
*G06F 9/50* (2006.01)

(52) U.S. Cl.
CPC .......... *G06F 9/5027* (2013.01); *G06F 9/5016* (2013.01)

(58) Field of Classification Search
CPC .............................. G06F 9/5027; G06F 9/5016
See application file for complete search history.

(56) References Cited

U.S. PATENT DOCUMENTS

| | | | | | |
|---|---|---|---|---|---|
| 6,463,480 | B2 * | 10/2002 | Kikuchi | ................ | G06F 9/4843 |
| | | | | | 719/315 |
| 6,868,442 | B1 * | 3/2005 | Burdeau | ............... | H04L 69/329 |
| | | | | | 719/310 |
| 8,099,596 | B1 * | 1/2012 | Rusakov | ................. | G06F 21/53 |
| | | | | | 726/28 |
| 8,458,422 | B1 * | 6/2013 | Holdman | ............ | G06F 11/1479 |
| | | | | | 711/E12.001 |

| | | | | | |
|---|---|---|---|---|---|
| 8,549,173 | B1 * | 10/2013 | Wu | ........................ | G06F 9/5016 |
| | | | | | 709/238 |
| 11,544,124 | B1 * | 1/2023 | Degioanni | ............ | G06F 9/5072 |
| 11,943,261 | B1 * | 3/2024 | Durand | ................... | H04L 63/20 |
| 12,050,943 | B1 * | 7/2024 | Kashtan | ............... | G06F 9/44505 |
| 12,111,940 | B1 * | 10/2024 | Durand | ................... | G06F 9/545 |
| 12,499,063 | B2 * | 12/2025 | Litichever | ............ | G06F 13/107 |
| 2002/0016813 | A1 * | 2/2002 | Woods | .................... | G06F 9/542 |
| | | | | | 718/107 |
| 2003/0120935 | A1 * | 6/2003 | Teal | ..................... | H04L 63/0823 |
| | | | | | 713/188 |
| 2004/0158720 | A1 * | 8/2004 | O'Brien | .................. | G06F 21/53 |
| | | | | | 713/176 |
| 2006/0168014 | A1 * | 7/2006 | Wang | ..................... | H04L 51/212 |
| | | | | | 709/206 |
| 2007/0118836 | A1 * | 5/2007 | Mensing | ............... | G06F 9/4843 |
| | | | | | 718/102 |
| 2007/0250540 | A1 * | 10/2007 | Hsu | ........................ | G06F 16/188 |
| 2008/0065839 | A1 * | 3/2008 | Pope | ....................... | G06F 9/545 |
| | | | | | 711/152 |
| 2008/0065840 | A1 * | 3/2008 | Pope | ....................... | G06F 9/468 |
| | | | | | 711/152 |
| 2013/0138649 | A1 * | 5/2013 | Broberg | .................. | H04L 65/80 |
| | | | | | 709/201 |
| 2014/0317238 | A1 * | 10/2014 | Mazahir | ............... | G06F 16/958 |
| | | | | | 709/219 |

(Continued)

*Primary Examiner* — Benjamin C Wu

(74) *Attorney, Agent, or Firm* — Young Basile Hanlon & MacFarlane, P.C.

(57) ABSTRACT

A program executing in kernel space monitors system calls associated with access to an operating system resource. Based on the monitoring, an access attempt to the operating system resource is detected. In response to detecting the access attempt, a process configured to handle the access to the operating system resource is spawned. The process may then terminated based on an expiration of an idle period.

20 Claims, 8 Drawing Sheets

(56)                 References Cited

U.S. PATENT DOCUMENTS

| | | | |
|---|---|---|---|
| 2014/0359111 A1* | 12/2014 | Hilmo | G06F 9/485 |
| | | | 709/224 |
| 2016/0132365 A1* | 5/2016 | Pan | G06F 9/54 |
| | | | 719/317 |
| 2016/0285970 A1* | 9/2016 | Cai | H04L 69/162 |
| 2016/0330073 A1* | 11/2016 | Li | G06F 21/53 |
| 2017/0024561 A1* | 1/2017 | Hajmasan | G06F 21/55 |
| 2017/0264666 A1* | 9/2017 | Lee | H04L 67/02 |
| 2023/0205595 A1* | 6/2023 | Singh | G06F 9/45558 |
| | | | 718/104 |
| 2023/0367833 A1* | 11/2023 | Kol | G06F 16/958 |
| 2023/0376486 A1* | 11/2023 | Trigonakis | G06F 9/5066 |
| 2024/0020153 A1* | 1/2024 | Xu | G06F 11/3409 |
| 2024/0104221 A1* | 3/2024 | Saieva | G06F 11/3698 |
| 2024/0289154 A1* | 8/2024 | Babiychuk | G06F 9/45558 |
| 2024/0396974 A1* | 11/2024 | Tiagi | H04L 69/16 |
| 2025/0272420 A1* | 8/2025 | Glenski | G06F 21/6218 |
| 2025/0328650 A1* | 10/2025 | Cosentino | G06F 21/566 |

\* cited by examiner

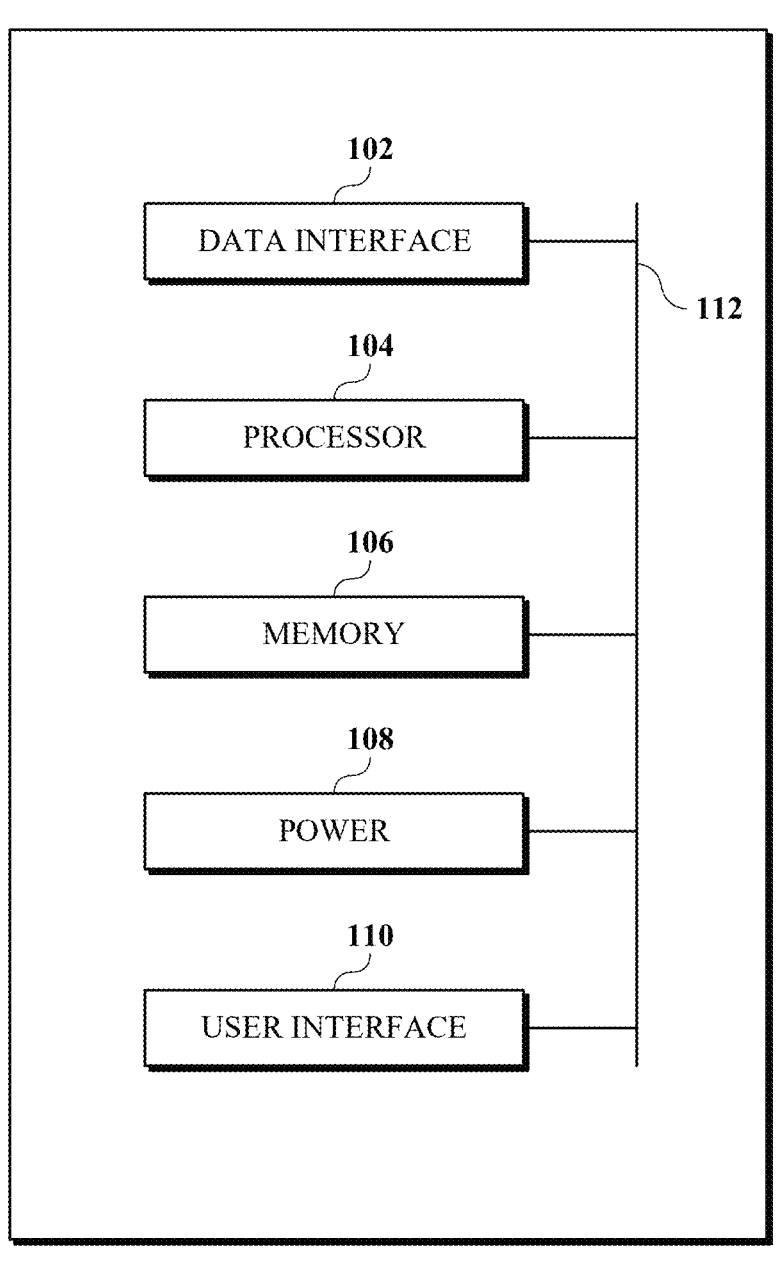
FIG. 1

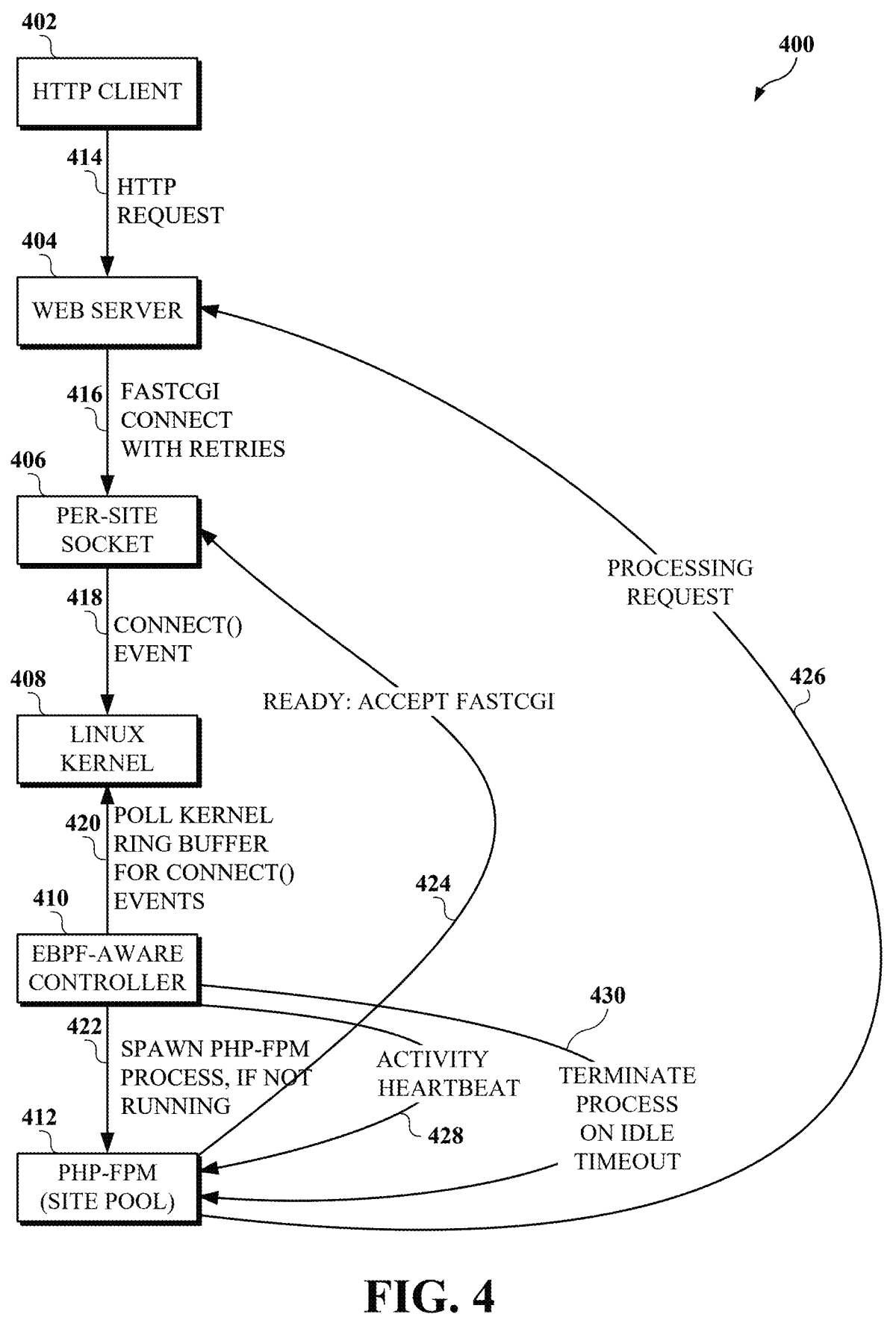

402

400

HTTP CLIENT

414 HTTP REQUEST

404

WEB SERVER

416 FASTCGI CONNECT WITH RETRIES

406

PER-SITE SOCKET

418 CONNECT() EVENT

408

LINUX KERNEL

READY: ACCEPT FASTCGI

420 POLL KERNEL RING BUFFER FOR CONNECT() EVENTS

410

EBPF-AWARE CONTROLLER

424

PROCESSING REQUEST

426

422 SPAWN PHP-FPM PROCESS, IF NOT RUNNING

430

ACTIVITY HEARTBEAT

TERMINATE PROCESS ON IDLE TIMEOUT

428

412

PHP-FPM (SITE POOL)

FIG. 4

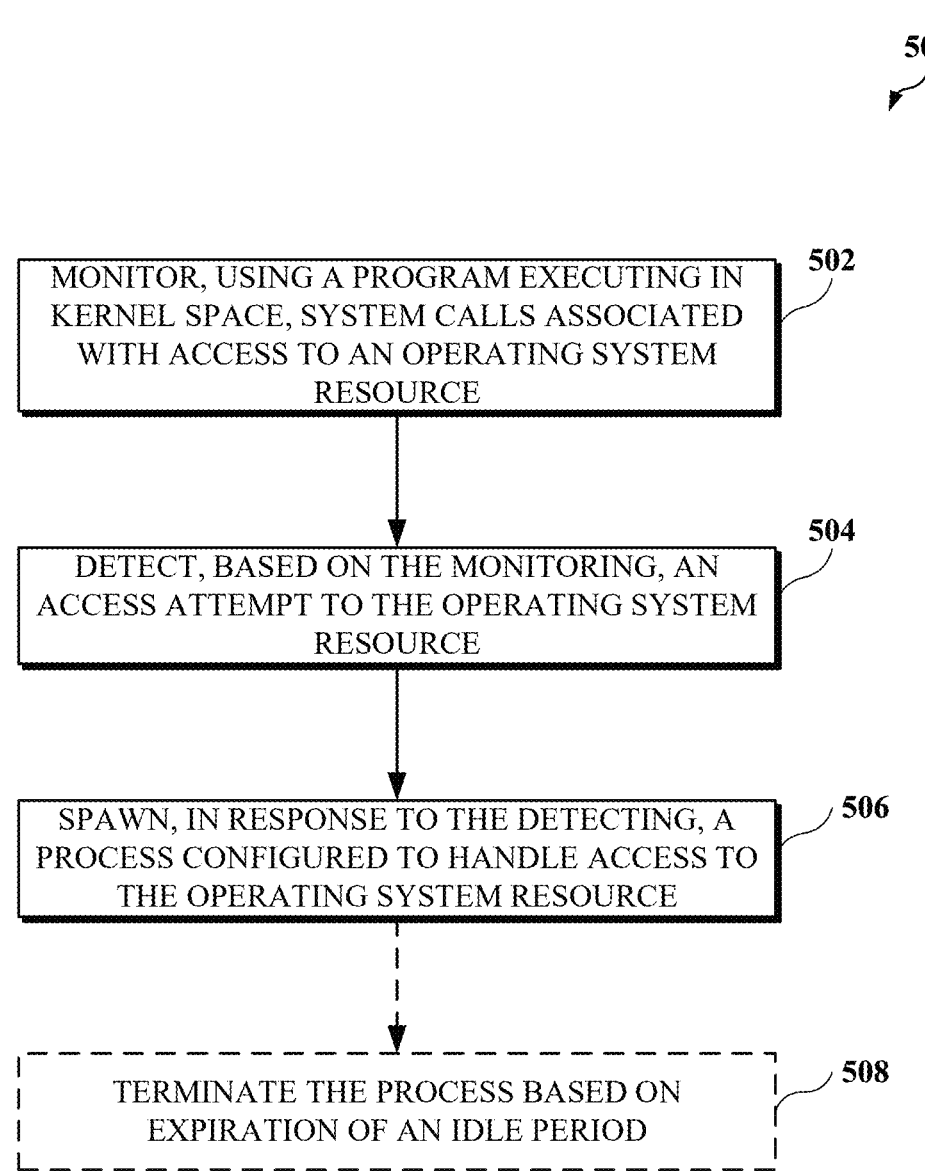

500

MONITOR, USING A PROGRAM EXECUTING IN KERNEL SPACE, SYSTEM CALLS ASSOCIATED WITH ACCESS TO AN OPERATING SYSTEM RESOURCE — 502

DETECT, BASED ON THE MONITORING, AN ACCESS ATTEMPT TO THE OPERATING SYSTEM RESOURCE — 504

SPAWN, IN RESPONSE TO THE DETECTING, A PROCESS CONFIGURED TO HANDLE ACCESS TO THE OPERATING SYSTEM RESOURCE — 506

TERMINATE THE PROCESS BASED ON EXPIRATION OF AN IDLE PERIOD — 508

MONITOR, BY A PROGRAM EXECUTING IN KERNEL SPACE, SOCKET ACTIVITY ASSOCIATED WITH A PLURALITY OF APPLICATIONS    602

DETECT, BASED ON THE MONITORED SOCKET ACTIVITY, AN ACCESS REQUEST DIRECTED TO A SOCKET FOR WHICH NO ACTIVE PROCESS INSTANCE IS PRESENT    604

INITIATE, IN RESPONSE TO THE DETECTING, A PROCESS INSTANCE ASSOCIATED WITH THE SOCKET    606

KERNEL-LEVEL RESOURCE ACTIVATION FOR PROCESS MANAGEMENT

FIELD

This disclosure generally relates to operating system resource management, and, more specifically, to kernel-level resource activation for process management.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a block diagram of an example of a computing device.

FIG. 4 illustrates another view of a complete operational flow of a KRAC system, showing the detailed sequence of interactions from initial HTTP request through process termination.

FIG. 5 is a flow diagram of a technique for kernel-level resource activation for process management.

DETAILED DESCRIPTION

Figure 2A:
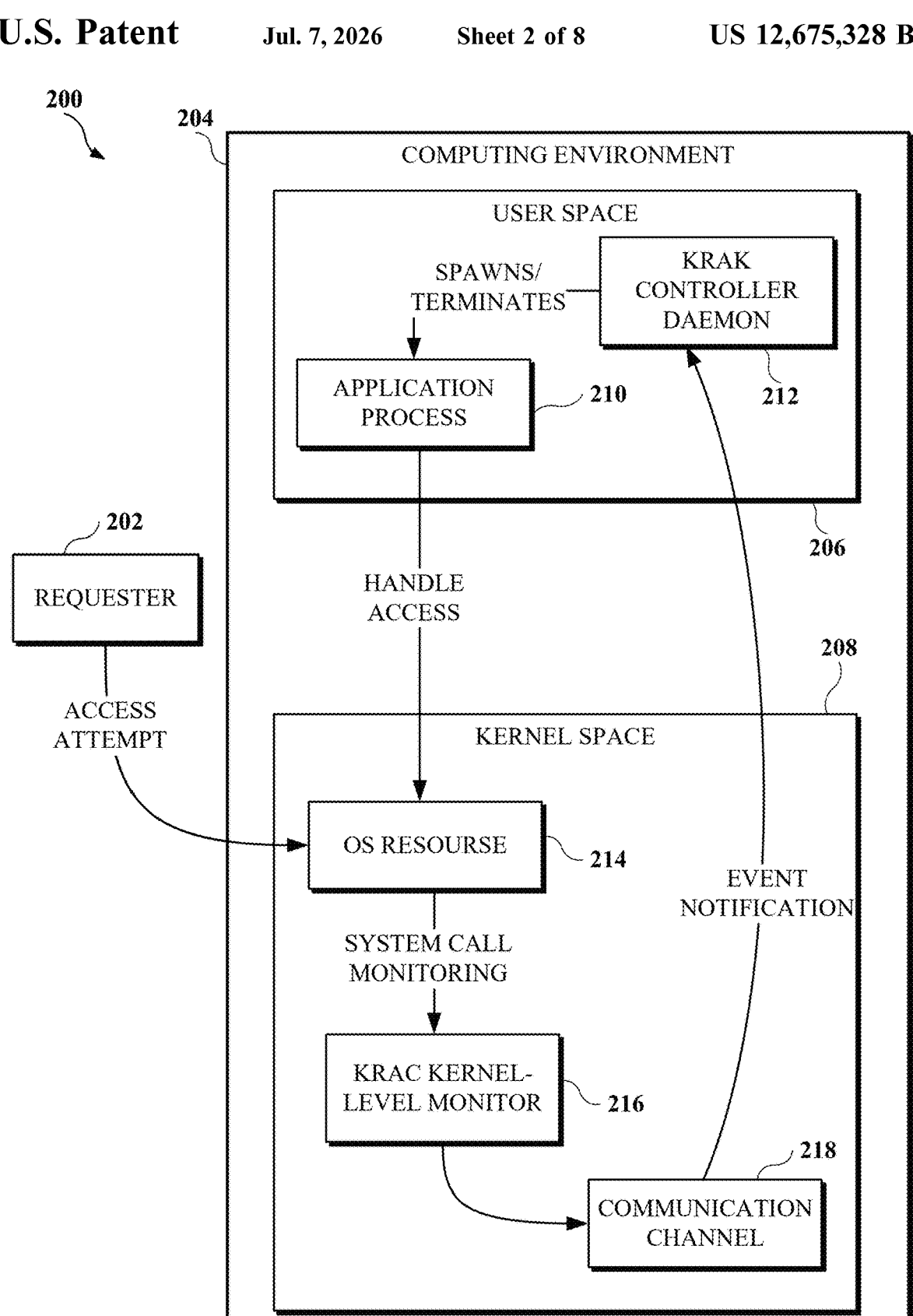
FIG. 2A is a block diagram of an example where kernel-level resource activation for process management may be implemented.

Modern computing environments, particularly those supporting multi-tenant applications and high-density hosting infrastructures, face the technical task of efficiently managing system resources while maintaining performance and scalability. In shared hosting environments, web hosting platforms, and distributed computing systems, numerous individual applications or services may require dedicated process instances, database connections, or other system resources to handle incoming requests. Each of these resources consumes memory and computational overhead even when idle. As deployments scale into the hundreds or thousands of applications, the inefficiencies become significant. This challenge extends beyond web hosting to encompass various socket-driven systems, including large-scale databases and application servers, where persistent connections are maintained for readiness rather than actual demand.

Conventional resource management approaches in shared hosting environments employ persistent process allocation strategies where dedicated service processes remain continuously active regardless of actual demand. For example, in traditional PHP-based web hosting implementations, illustrative of broader socket-driven systems, each hosted website may be assigned a dedicated PHP FastCGI Process Manager (PHP-FPM) daemon that maintains a persistent presence in system memory. While this approach may facilitate immediate responsiveness to incoming requests, it results in significant memory consumption across large-scale deployments. The aggregate resource utilization of hundreds or thousands of idle processes significantly diminishes overall server efficiency and imposes constraints on the total number of applications that may be hosted on a single server instance.

Some existing solutions have attempted to address resource efficiency through various activation mechanisms, including systemd socket activation frameworks. Systemd is a system and service manager for Linux operating systems that includes socket activation capabilities, wherein a listening socket may be created for each service, and when a connection is made to a specific socket, the corresponding service process may be initiated on-demand rather than running continuously. However, such conventional implementations may face scalability limitations when managing large numbers of service units because the administrative and computational overhead of tracking, activating, and coordinating thousands of individual .socket and .service unit pairs may introduce performance degradation. In environments requiring thousands of socket and service pairs, the cumulative overhead introduced by traditional activation mechanisms may create performance degradation. The management complexity increases significantly as each individual service requires corresponding configuration units, resulting in administrative overhead that may grow linearly with the number of hosted applications.

Current monitoring and activation technologies often rely primarily on user-space polling mechanisms or service-level monitoring approaches that may introduce additional latency and resource consumption. These traditional monitoring systems often lack the granular, real-time visibility into system-level events that may be necessary for efficient on-demand resource activation.

Kernel-level monitoring tools, which may provide low-level access to observe system calls and kernel events in real-time, include technologies such as System Tap (a scripting platform for Linux kernel instrumentation) and DTrace (a dynamic tracing framework originally developed for Solaris systems). While these tools may provide system activity observation capabilities, including socket calls, they are restricted to tracing and diagnostics, without the ability to perform control actions. This limitation may prevent them from being used effectively for real-time resource control in high-performance environments where both system observation and responsive action capabilities are needed.

Persistent resource allocation in high-density hosting environments may include relatively high memory utilization that degrades the performance of the overall hosting system and may cause some operations to fail due to resource exhaustion. Long-running processes may experience memory leaks where allocated memory is not properly released during operation, resulting in gradual memory consumption growth that may lead to system instability, application crashes, or unpredictable behavior over extended operational periods. The persistent maintenance of thousands of idle processes may also include substantially increased investment in server hardware, memory resources, and energy consumption for that hosting infrastructure. The cumulative memory overhead of continuously running processes may also result in increased power expenditures needed to operate those increased memory and processing resources, increased cooling requirements for data center facilities, and associated emissions that may result from the generation of that energy.

Implementations according to this disclosure address problems such as these by providing a Kernel-Level Resource Activation Controller (KRAC) that employs on-demand process activation for operating system resources. The disclosed subject matter may facilitate dynamic spawning and termination of application processes in response to real-time system call monitoring, thereby addressing memory inefficiencies and scalability limitations in multi-tenant computing environments. The KRAC (which may be implemented using hardware components, software components, or a combination thereof such as conventional processors, memory, and software including kernel-level programs) may leverage kernel-space monitoring programs to observe access attempts to operating system resources and initiate corresponding handler processes only when needed, rather than maintaining persistent idle processes. This approach may enhance scalability and performance in multi-tenant environments by reducing memory overhead compared to traditional persistent process models.

The principal objects of the disclosed KRAC may include enhancing system resource efficiency, improving scalability in shared hosting environments, and reducing the computational overhead associated with maintaining persistently active but idle processes. The KRAC may employ Extended Berkeley Packet Filter (eBPF) programs (which may also be referred to as kernel instrumentation tools, kernel monitoring components, or kernel-space execution programs) configured to execute within kernel space without requiring modification of kernel source code. Advantages may include improved memory efficiency, improved scalability for supporting numerous applications, reduced latency through kernel-level monitoring, the ability to host a greater number of applications on a given hardware instance, and improved process isolation. These monitoring programs may observe system calls, such as connect operations, directed to operating system resources and may communicate detected events to controller components for appropriate action.

As used herein, the term "operating system resource" may refer to a kernel-managed entity facilitating communication or data exchange. In some implementations, the operating system resources may include UNIX sockets (which may also be referred to as domain sockets, local sockets, or inter-process communication endpoints) associated with individual websites or applications in shared hosting environments. Examples of operating system resources may include sockets, pipes, ports, or database connection endpoints.

The KRAC may be or include a controller daemon (which may also be referred to as a process spawner, resource manager, or eBPF-aware controller) executing in user space and configured to receive event notifications from kernel-space monitoring programs through ring buffer mechanisms. This controller component may perform dynamic process spawning and termination operations, may queue subsequent access attempts during process initialization, and may implement connection retry logic to maintain service availability. In some implementations, spawned processes may be isolated within dedicated operating system namespaces to provide process and resource separation, and the KRAC may monitor the spawned process for activity to determine idleness and an appropriate termination timing based on request processing activity levels. The disclosed subject matter may also encompass releasing memory resources upon process termination and managing multiple resource instances in parallel across multi-tenant computing environments.

In some implementations, the KRAC may support PHP FastCGI Process Manager (PHP-FPM) instances, also referred to as FastCGI process pools or application handlers, which are dynamically spawned to handle incoming requests and terminated after predetermined idle periods to conserve system memory. A request flow may begin when a client transmits an HTTP request for a specific website to a web server, which attempts to establish a FastCGI connection to a per-site UNIX socket associated with the requested site. If no PHP-FPM process is actively listening on the target socket, the connect operation may trigger a system call event (e.g., a connect( ) system call) that is captured by an eBPF monitoring program and relayed through a ring buffer to an eBPF-aware controller daemon. The KRAC may then initiate spawning of a PHP-FPM site pool to handle the request, while the web server may employ connection retry mechanisms to ensure availability during the initialization period.

"Site pool" refers to a collection of PHP-FPM worker processes dedicated to a website. Once spawned, the controller may monitor the PHP-FPM instance for activity, for example, by tracking ongoing request processing. Upon expiration of an idle period during which no activity is detected, the controller may terminate the process to release allocated memory resources.

Implementations according to this disclosure provide several technical advantages over conventional resource management approaches. By dynamically spawning processes only when an access attempt is detected, the described implementations may improve memory efficiency, as system memory is allocated only when required, rather than being consumed by persistently idle processes. This may facilitate improved scalability, enabling the hosting of a greater number of websites or applications on a single server instance without performance degradation. Furthermore, the use of low-latency kernel-level monitoring, for example, through eBPF programs, may reduce process activation (e.g., cold-start) latency compared to conventional user-space polling mechanisms. Process activation latency refers to the delay between process activation request and readiness to handle requests. In some implementations, security may be improved by isolating spawned processes within dedicated operating system namespaces, which provides for per-website process and resource control. The low overhead of kernel-level monitoring may also avoid the resource consumption associated with traditional service monitoring or polling-based activation systems.

While the teachings herein are primarily described with respect to websites implemented with PHP and FastCGI process management, the disclosure is not so limited. The disclosed KRAC techniques may be applied to various computing contexts where resource-efficient, on-demand process management may be beneficial, including database systems, application servers, web hosting platforms, and other multi-tenant environments. The disclosed subject matter may address technical problems including excessive memory consumption from idle processes, scalability limitations in high-density deployments, administrative overhead from managing numerous service activation units, and the absence of low-latency kernel-level monitoring capabilities with responsive control actions in conventional resource management approaches.

To describe some implementations in greater detail, reference is first made to examples of hardware and software structures used to implement kernel-level resource activation for process management. FIG. 1 is a block diagram of an example of a computing device 100. The computing device 100 may implement, execute, or perform, one or more aspects of the methods and techniques described herein. The computing device 100 includes a data interface 102, a processor 104, memory 106, a power component 108, a user interface 110, and a bus 112 (collectively, components of the computing device 100). Although shown as a distinct unit, one or more of the components of the computing device 100 may be integrated into respective distinct physical units. For example, the processor 104 may be integrated in a first physical unit and the user interface 110 may be integrated in a second physical unit. The computing device 100 may include aspects or components not expressly shown in FIG. 1, such as an enclosure or one or more sensors.

In some implementations, the computing device 100 is a stationary device, such as a personal computer (PC), a server, a workstation, a minicomputer, or a mainframe computer. In some implementations, the computing device 100 is a mobile device, such as a mobile telephone, a personal digital assistant (PDA), a laptop, or a tablet computer.

The data interface 102 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 102 may include, or may be, a transceiver. Although not shown separately in FIG. 1, the data interface 102 may include, or may be operatively coupled with, an antenna for wireless electronic communication. Although not shown separately in FIG. 1, the data interface 102 may include, or may be operatively coupled with, a wired electronic communication port, such as an Ethernet port, a serial port, or another wired port, that may interface with, or may be operatively coupled to, a wired electronic communication medium.

In some implementations, the data interface 102 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 100, or one or more of the components thereof, and one or more external electronic or computing devices. Although shown as one unit in FIG. 1, the data interface 102 may include multiple physical components, such as a wired data interface and a wireless data interface.

For example, the computing device 100 may electronically communicate, such as transmit, receive, or exchange computer accessible data, with one or more other computing devices via one or more wired or wireless communications links, or connections, such as via a network, using the data interface 102, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 104 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 104 is implemented as a central processing unit (CPU), such as a microprocessor. In some implementations, the processor 104 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 104 includes one or more processing units. A processing unit may include one or more processing cores. The computing device 100 may include multiple physical or virtual processing units (collectively, the processor 104), which may be interconnected, such as via wired, or hardwired, connections, via wireless connections, or via a combination of wired and wireless connections. In some implementations, the processor 104 is implemented in a distributed configuration including multiple physical devices or units that may be coupled directly or across a network. The processor 104 includes internal memory (not expressly shown), such as a cache, a buffer, a register, or a combination thereof, for internal storage of data, such as operative data, instructions, or both. For example, the processor 104 may read data from the memory 106 into the internal memory (not shown) for processing.

The memory 106 is a non-transitory computer-usable or computer-readable medium, implemented as a tangible device or component of a device. The memory 106 contains, stores, communicates, transports, or a combination thereof, data, such as operative data, instructions, or both. For example, the memory 106 stores an operating system of the computing device 100, or a portion thereof. The memory 106 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 106 may include non-volatile memory, such as a disk drive, or another form of non-volatile memory capable of persistent electronic data storage, such as in the absence of an active power supply. The memory 106 may include, or may be implemented as, one or more physical or logical units.

The memory 106 stores executable instructions or data, such as application data, an operating system, or a combination thereof, for access, such as read access, write access, or both, by the other components of the computing device 100, such as by the processor 104. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 106 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 108 obtains, stores, or both, power, or energy, used by the components of the computing device 100 to operate. The power component 108 may be implemented as a general-purpose alternating-current (AC) electric power supply, or as a power supply interface, such as an interface to a household power source or other external power distribution system. In some implementations, the power component 108 may be implemented as a single use battery or a rechargeable battery such that the computing device 100 operates, or partially operates, independently of an external power distribution system. For example, the power component 108 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 100.

The user interface 110 includes one or more units or devices for interfacing with an operator of the computing device 100, such as a human user. In some implementations, the user interface 110 obtains, receives, captures, detects, or otherwise accesses, data representing user input to the computing device, such as via physical interaction with the computing device 100. In some implementations, the user interface 110 outputs, presents, displays, or otherwise makes available, information, such as to an operator of the computing device 100, such as a human user.

The user interface 110 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a user interface 110 may be omitted, or absent, from the computing device 100.

The bus 112 distributes or transports data, power, or both among the components of the computing device 100 such that the components of the computing device are operatively connected. Although the bus 112 is shown as one component in FIG. 1, the computing device 100 may include multiple busses, which may be connected, such as via bridges, controllers, or adapters. For example, the bus 112 may be implemented as, or may include, a data bus and a power bus. The execution, or performance, of instructions, programs, code, applications, or the like, to perform the methods and techniques described herein, or aspects or portions thereof, may include controlling, such as by sending electronic signals to, receiving electronic signals from, or both, the other components of the computing device 100.

Although not shown separately in FIG. 1, data interface 102, the power component 108, or the user interface 110 may include internal memory, such as an internal buffer or register.

Although an example of a configuration of the computing device 100 is shown in FIG. 1, other configurations may be used. One or more of the components of the computing device 100 shown in FIG. 1 may be omitted, or absent, from the computing device 100 or may be combined or integrated. For example, the memory 106, or a portion thereof, and the processor 104 may be combined, such as by using a system on a chip design.

FIG. 2A is a block diagram of an example 200 where kernel-level resource activation for process management may be implemented. The example 200 is shown as including a computing environment 204 and a requester 202. The computing environment 204, which can be the computing device 100 of FIG. 1, includes a user space 206 and a kernel space 208. The user space 206 is shown as including an application process 210 and a KRAC controller daemon 212. The kernel space 208 is shown as including an operating system resource 214, a KRAC kernel-level monitor 216, and a communication channel 218. In some implementations, the application process 210 and the KRAC controller daemon 212 may be deployed on the same computing device or distributed across multiple computing devices within the computing environment 204. Two or more of the application process 210 and the KRAC controller daemon 212 may be integrated into a single component.

The requester 202 may be configured to initiate access attempts to operating system resources within the computing environment 204, such as the operating system resource 214. The requester 202 may represent a client application or any software component that requires access to a managed resource within the computing environment 204. The requester 202 may be or include a client application, a database client, or another software component that generates requests for operating system resources. The requester 202 may transmit direct or indirect access attempts to the operating system resource 214 using various communication protocols and interfaces and may be configured to handle different types of resource requests, including socket connections, file operations, or database access operations. The requester 202 may be configured to generate system calls that trigger monitoring events within the kernel space 208 and may operate across network boundaries, enabling remote access to resources within the computing environment 204.

The computing environment 204 may be configured to provide a framework for dynamic process management and resource activation that facilitates monitoring system calls associated with access to operating system resources and spawning processes configured to handle access to operating system resources. The computing environment 204 represents the overarching hardware and software infrastructure and may include one or more physical or virtual servers, processors, memory, and an operating system that manages the execution of various processes and services. The computing environment 204 may support multi-tenant configurations where multiple applications or services share common underlying resources.

The computing environment 204 is logically partitioned into the user space 206 and the kernel space 208, which represent different privilege levels of the operating system and facilitate the protection of core system functions while enabling application-level software to execute. The computing environment 204 may be a host system configured to support a plurality of application instances, where each application instance is associated with a corresponding operating system resource 214. The computing environment 204 may support various operating systems, hardware architectures, and deployment models.

The user space 206 may be configured to provide an execution environment for application processes and controller components that operate outside of the operating system kernel (e.g., the kernel space 208). The user space 206 is the region of the operating system memory of the computing environment 204 where application software executes, and processes running in the user space 206 have restricted access to system hardware and kernel data structures. The user space 206 serves as the execution environment for higher-level management and application logic and contains the KRAC controller daemon 212, which orchestrates the spawning and termination of the application process 210 based on notifications received from the kernel space 208. The user space 206 may include virtual memory spaces, process isolation mechanisms, and inter-process communication facilities and may be structured to support isolated execution environments for different application processes, where spawning the process may include spawning the process within an isolated operating system namespace.

The kernel space 208 may be configured to provide low-level system services, hardware abstraction, and privileged operations that are not accessible from user space applications. The kernel space 208 is the protected memory space where the core of the operating system, the kernel, resides and executes and has unrestricted access to all system hardware and memory. In some implementations, the kernel space 208 may include device drivers, file system implementations, network stack components, and memory management subsystems. The kernel space 208 may support various kernel architectures, including monolithic kernels, microkernels, or hybrid kernel designs.

The kernel space 208 provides the foundation for the disclosed on-demand activation mechanism by enabling direct monitoring of system-level events and interacts with the user space 206 through system calls initiated from the user space 206. Monitoring system calls includes hooking into a kernel of the operating system to observe the system calls, which may be accomplished by attaching a probe to monitor kernel events related to resource access requests in a computing environment. The kernel space 208 may provide interfaces for kernel-level monitoring programs to attach to system call hooks and observe system events.

The application process 210 may be configured to handle access to operating system resources and provide application-specific functionality in response to requests from the requester 202. The application process 210 represents the service or application logic that is activated on-demand, and when active, the application process 210 listens for and services requests directed to its associated operating system resource 214. In some implementations, the application process 210 may include database servers, application runtime environments, or specialized service processes. The application process 210 may support various programming languages, frameworks, and execution models.

The application process 210 may be configured to operate in both active and inactive states, where inactive processes consume minimal system resources until activated by the KRAC controller daemon 212. The KRAC controller daemon 212 may be configured to monitor the application process 210 to determine request processing activity levels. The application process 210 may be executed in response to receiving an incoming connection request, and spawning the process may include initializing a process configuration based on the operating system resource and allocating memory resources for the process within a shared hosting environment.

The KRAC controller daemon 212 may be configured to perform dynamic process spawning and termination operations based on system call events detected by kernel-level monitoring programs. The KRAC controller daemon 212 is a user-space component configured to manage the lifecycle of the application process 210 and listens for event notifications from the kernel space 208 via the communication channel 218. The KRAC controller daemon 212 may include process lifecycle management capabilities, resource allocation mechanisms, and policy enforcement features. Upon receiving a notification indicating an access attempt to an un-serviced operating system resource 214, the KRAC controller daemon 212 may be configured to initiate the spawning of the appropriate application process 210.

The KRAC controller daemon 212 may implement queuing mechanisms for subsequent access attempts during process initialization periods and connection retry logic to maintain service availability during process spawning operations. The KRAC controller daemon 212 may be configured to monitor the spawned process for activity to determine when the spawned process becomes idle. In some implementations, during the spawning of the application process 210, the KRAC controller daemon 212 may be configured for queuing subsequent access attempts to the operating system resource during spawning of the process and processing the queued access attempts upon completion of the spawning.

The KRAC kernel-level monitor 216 and the communication channel 218 may be configured to operate cooperatively to provide real-time monitoring and event notification capabilities.

The operating system resource 214 may be or provide communication endpoints, data exchange mechanisms, or other kernel-managed entities that facilitate access from user space applications. The operating system resource 214 is a kernel-managed (i.e., operating-system managed) entity that facilitates communication or data exchange and is the target of access attempts from the requester 202. The operating system resource 214 may be or include sockets, pipes, ports, database connection endpoints, or other communication mechanisms. The operating system resource 214 is the focal point of the monitoring activity performed by the KRAC kernel-level monitor 216, and access attempts to the operating system resource 214, such as a connect( ) system call, trigger the on-demand activation logic.

The operating system resource 214 may be configured to generate or cause the generation of system call events when access attempts are made by external requesters or application processes. The operating system resource 214 may support concurrent access from multiple clients and processes.

The KRAC kernel-level monitor 216 may be configured to observe system calls associated with access to the operating system resource 214 and detect access attempts to the operating system resource 214 in the absence of active processes. The KRAC kernel-level monitor 216 is a program executing in the kernel space 208 and configured for monitoring system calls associated with access to an operating system resource 214 and is designed to detect an access attempt to the operating system resource 214, particularly in an absence of an active process associated with the operating system resource.

In some implementations, the KRAC kernel-level monitor 216 may include Extended Berkeley Packet Filter programs, kernel modules, or other kernel-space monitoring technologies. The program executing in kernel space may include an eBPF program, and monitoring the system calls includes attaching an extended Berkeley Packet Filter (eBPF) program to a kernel hook. eBPF programs provide significant advantages for kernel-level monitoring by executing custom code within the kernel space without requiring modification of the kernel source code. eBPF programs may facilitate safe, efficient monitoring with minimal performance overhead and may be dynamically loaded and unloaded without system reboots or kernel recompilation. This approach may enable real-time system call observation while maintaining system stability and security through built-in verification mechanisms that, for example, may validate eBPF program bytecode before execution, ensuring memory safety by preventing buffer overflows and infinite loops, and restricting program capabilities to prevent unauthorized kernel modifications.

The KRAC kernel-level monitor 216 observes the operating system resource 214 and, upon detecting a relevant system call, sends an event notification through the communication channel 218 to the KRAC controller daemon 212. In some implementations, the KRAC kernel-level monitor 216 can be attached to the kernel function that handles, for example, connect( ) system calls to monitor any connection attempts directed at the operating system resource 214, and the system call associated with access to the socket may include a connect( ) system call.

The communication channel 218 may be configured to transmit data related to system call events from kernel space monitoring components to user space controller daemons. The communication channel 218 provides a mechanism for transmitting event data from the kernel space 208 to the user space 206, and when the KRAC kernel-level monitor 216 detects a relevant event, such as an access attempt, it may place a notification into the communication channel 218. The communication channel 218 may include ring buffers, event queues, shared memory segments, or other inter-process communication mechanisms and serves as a data pathway between the kernel space 208 and the user space 206. In some implementations, communicating the occurrence of a system call may include using an eBPF ring buffer to transmit data related to the system calls from the kernel space to the KRAC controller daemon 212 in the user space, and the program may be configured to observe the system calls through a ring buffer mechanism.

The separation of the communication channel 218 from the KRAC kernel-level monitor 216 may provide architectural advantages including decoupling of monitoring logic from communication mechanisms, enabling scalability through efficient handling of high-frequency events, and providing flexibility to implement different communication strategies without modifying kernel-space monitoring code. The communication channel 218 may facilitate asynchronous communication that prevents blocking operations in the KRAC kernel-level monitor 216, thereby maintaining optimal performance of kernel-level monitoring activities. In some implementations, the KRAC kernel-level monitor 216 may communicate directly with the KRAC controller daemon 212 through alternative kernel-to-user-space communication mechanisms, such as netlink sockets or character device interfaces, including interfaces such as serial ports (e.g., /dev/ttyS0) or terminal devices (TTYs).

Figure 2B:
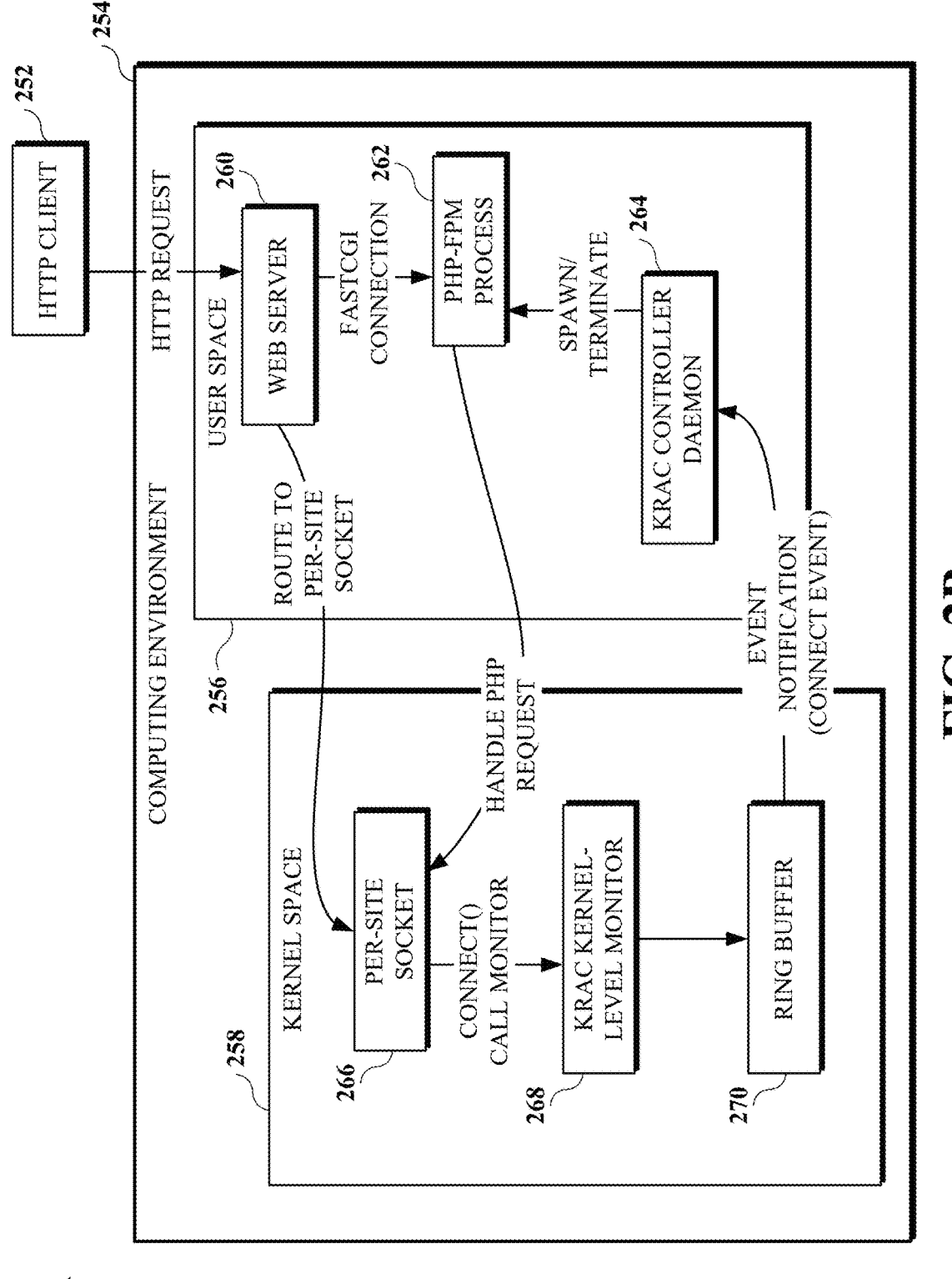
FIG. 2B is a block diagram of an example that illustrates a specific implementation of the kernel-level resource activation system that is specifically directed to web hosting environments utilizing PHP-based applications.

FIG. 2B is a block diagram of an example 250 that illustrates a specific implementation of the kernel-level resource activation system that is specifically directed to web hosting environments utilizing PHP-based applications. The example 250 includes a computing environment 254 (that includes a user space 256 and a kernel space 258), an HTTP client 252, a web server 260, a PHP-FPM process 262, a KRAC controller daemon 264, a per-site UNIX socket 266, a KRAC kernel-level monitor 268, and a ring buffer 270. The HTTP client 252, web server 260, and PHP-FPM process 262 may be implementations of the requester 202, application process 210, and associated components of FIG. 2A. The KRAC controller daemon 264, per-site UNIX socket 266, KRAC kernel-level monitor 268, and ring buffer 270 may be implementations of the KRAC controller daemon 212, operating system resource 214, KRAC kernel-level monitor 216, and communication channel 218 of FIG. 2A, respectively.

PHP (PHP: Hypertext Preprocessor) is a widely used server-side scripting language designed for web development that executes on web servers to generate dynamic web content. In conventional Linux-based implementations, utilizing systemd socket activation, each website is assigned a corresponding .socket unit and .service unit. When managing a large number of websites, such as deployments exceeding one thousand .socket and .service pairs, the cumulative overhead introduces significant performance degradation, as described above. Additionally, traditional PHP hosting approaches maintain persistent PHP FastCGI Process Manager (PHP-FPM) instances for each hosted website, resulting in significant memory consumption even when websites are idle.

The implementation shown in FIG. 2B addresses these limitations by employing on-demand activation of PHP-FPM processes through kernel-level monitoring. The HTTP client 252 (which may be, for example, a web browser) may transmit HTTP requests to the web server 260, which routes requests to per-site UNIX socket 266 associated with specific websites. The KRAC kernel-level monitor 268, implemented as an eBPF program, may monitor connect( ) system calls directed to the per-site UNIX socket 266. When no active PHP-FPM process 262 is listening on the target socket, the connect operation triggers an event notification through the ring buffer 270 to the KRAC controller daemon 264.

The ring buffer 270 is a circular data structure that uses a fixed-size buffer as if it were connected end-to-end, enabling efficient producer-consumer communication where the KRAC kernel-level monitor 268 writes event data and the KRAC controller daemon 264 reads event data without requiring locks or memory allocation during operation. The ring buffer 270 may buffer system call event data including connect( ) call information, socket identifiers, process identifiers, timestamps, and other metadata associated with access attempts to operating system resources.

The buffering may facilitate asynchronous processing of system call events, enabling the KRAC kernel-level monitor 268 to continue monitoring without waiting for user-space processing. The ring buffer may handle burst traffic scenarios where multiple rapid connect attempts occur simultaneously, preventing event loss by temporarily storing connect events when the controller daemon cannot process them immediately. This may prevent loss of spawning triggers during high-traffic periods in multi-tenant environments where hundreds of concurrent connection attempts may overwhelm user-space processing capabilities.

The KRAC controller daemon 264 may dynamically spawn a PHP-FPM process 262 configured as a site pool to handle requests for the specific website. To determine the correct parameters for the new process, the KRAC controller daemon 264 may maintain a configuration map that associates each per-site UNIX socket 266 with specific parameters, such as a user account, a PHP version, and resource limits required for the corresponding PHP-FPM pool of the website.

To facilitate service availability while the KRAC controller daemon 264 is spawning the PHP-FPM process 262, the web server 260 may be configured to implement a connection retry mechanism. For example, the web server 260 may be configured with a short connection timeout and multiple retry attempts for the FastCGI connection. This configuration may provide the KRAC controller daemon 264 with a sufficient time window to spawn the PHP-FPM process 262 before an external Hypertext Transfer Protocol (HTTP) request from the HTTP client 252 times out, thereby ensuring that the request is handled once the process becomes active. Once active, the PHP-FPM process 262 may handle PHP script execution and generate responses to HTTP requests. The KRAC controller daemon 264 may monitor the PHP-FPM process 262 for activity and automatically terminate the process after a predetermined idle period, thereby releasing allocated memory resources and optimizing system efficiency in high-density shared hosting deployments.

Figure 3A:
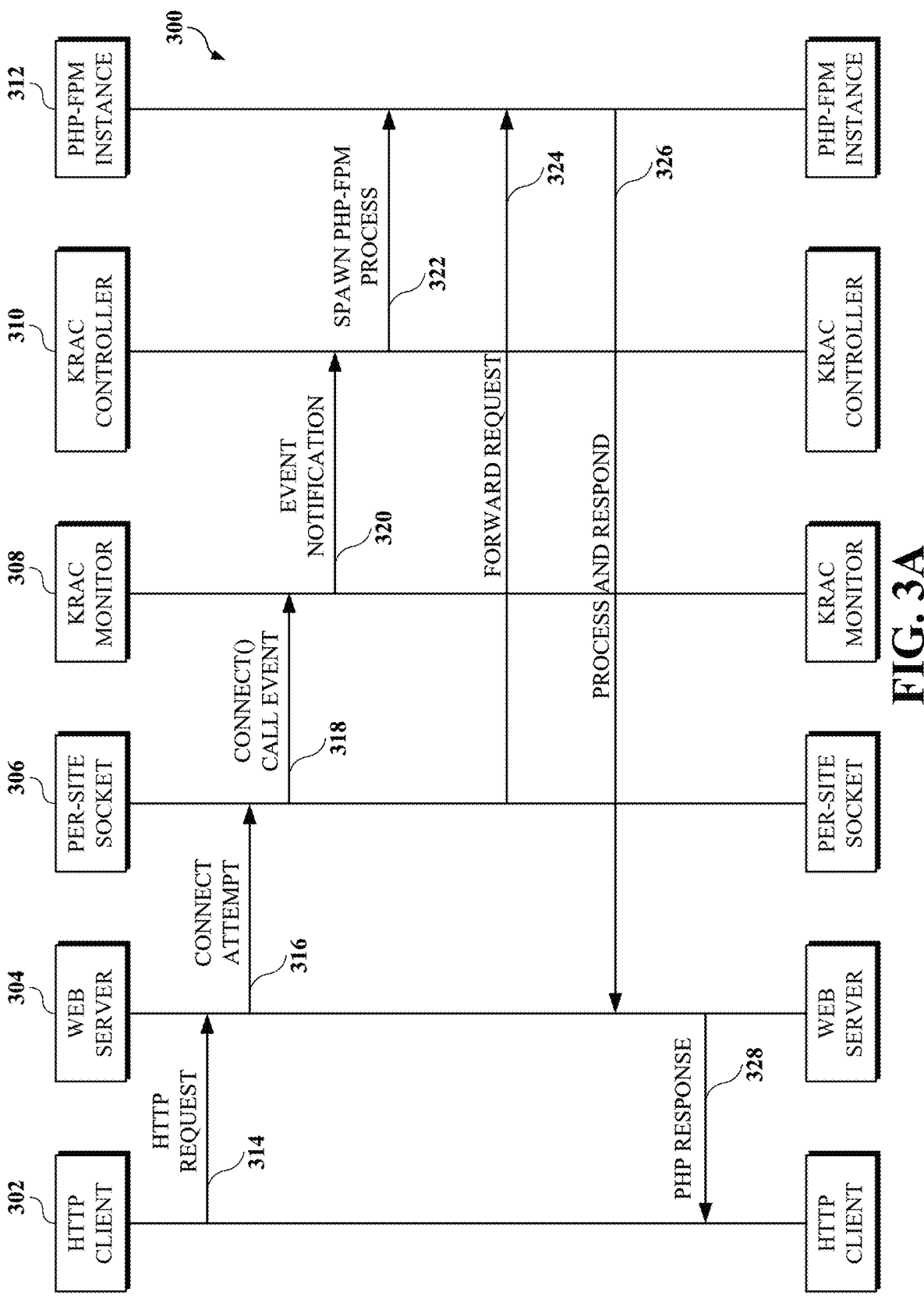
FIG. 3A is an example of an interaction diagram illustrating a sequence of operations when an HTTP request is received for a website that does not have an active PHP-FPM process.
Figure 3B:
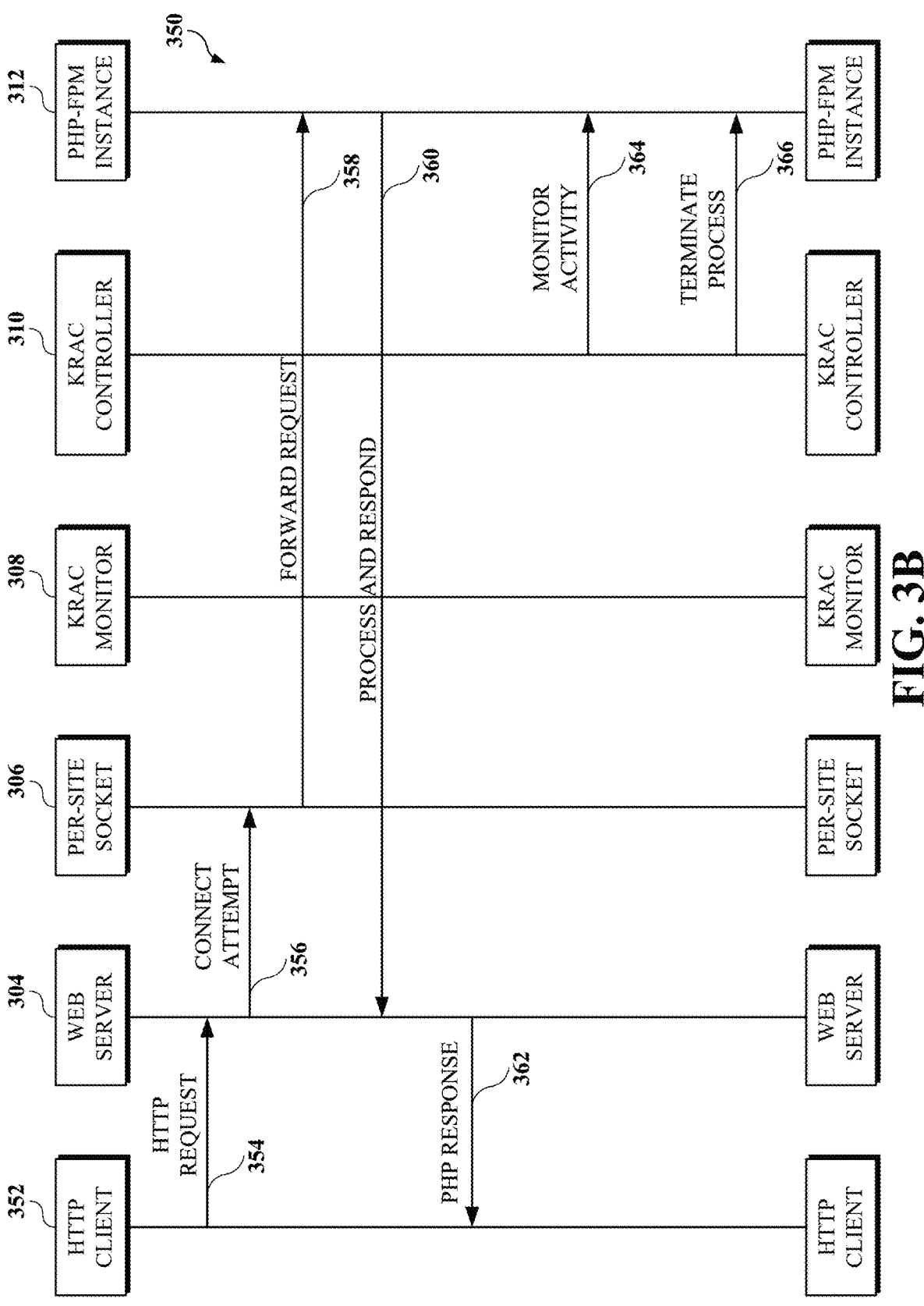
FIG. 3B is an example of an interaction diagram illustrating the sequence of operations for subsequent HTTP requests when an active PHP-FPM process is already running.

FIGS. 3A and 3B illustrate an example of an operational flow of the KRAC system in a PHP web hosting environment. Each website may be assigned a unique UNIX socket, such as /run/site123/php.socket, that serves as the communication endpoint for that specific site. The KRAC system may employ eBPF programs to hook into the kernel and monitor connect( ) system calls corresponding to access events on these per-site UNIX sockets. Upon detection of a connection attempt when no PHP-FPM instance is active, as shown in FIG. 3A, a KRAC controller daemon may dynamically spawn the corresponding PHP-FPM process on demand. The spawned process may remain active while handling incoming traffic, as described with respect to FIG. 3B, and may be automatically terminated after a predefined idle timeout period, thereby conserving system memory and optimizing resource utilization in high-density hosting deployments.

FIG. 3A is an example of an interaction diagram 300 illustrating a sequence of operations when an HTTP request is received for a website that does not have an active PHP-FPM process. The interaction diagram 300 includes an HTTP client 302, a web server 304, a per-site socket 306, a KRAC monitor 308, a KRAC controller 310, and a PHP-FPM instance 312. The HTTP client 302, the web server 304, the per-site socket 306, the KRAC monitor 308, the KRAC controller 310, and the PHP-FPM instance 312 may be or may be implementations of the HTTP client 252, the web server 260, the per-site UNIX socket 266, the KRAC kernel-level monitor 268, the KRAC controller daemon 264, and the PHP-FPM process 262 of FIG. 2B, respectively.

At 314, the HTTP client 302 transmits an HTTP request to the web server 304 for a specific website resource. At 316, the web server 304 may route the request to the appropriate per-site socket by initiating a connect attempt. When no active PHP-FPM process is listening on the per-site socket 306, the connect attempt generates a connect( ) call event, at 318, that is detected by the KRAC monitor 308. At 320, the KRAC monitor 308 may transmit an event notification to the KRAC controller 310, indicating that an access attempt has been made to an operating system resource without an active process. At 322, in response to receiving the event notification, the KRAC controller 310 may determine that no active process is associated with the per-site socket 306 and may initiate spawning of a PHP-FPM instance 312.

Once the PHP-FPM instance 312 becomes ready and begins listening on the per-site socket 306, the web server 304 may forward the request, at 324, to the PHP-FPM instance 312, which processes the request once ready. At 326, the PHP-FPM instance 312 may process the PHP script and respond to the web server 304, which then transmits, at 328, the PHP response back to the HTTP client 302. In some implementations, if the initial connect attempt, at 316, fails due to timing, the web server 304 may implement connection retry mechanisms with short timeouts to provide the KRAC controller 310 sufficient time to spawn the PHP-FPM instance 312 before the HTTP request times out. This retry logic may facilitate seamless operation during the on-demand activation process while maintaining service availability.

FIG. 3B is an example of an interaction diagram 350 illustrating the sequence of operations for subsequent HTTP requests when an active PHP-FPM process is already running. The interaction diagram 350 includes an HTTP client 352, which may be the same as or different from the HTTP client 302 of FIG. 3A, and the same web server 304, the per-site socket 306, the KRAC monitor 308, the KRAC controller 310, and the PHP-FPM instance 312 from FIG. 3A. The interaction diagram 350 demonstrates normal operation when the PHP-FPM instance 312 is already active and listening on the per-site socket 306.

At 354, the HTTP client 352 may transmit an HTTP request to the web server 304, which initiates a connect attempt 356 to the per-site socket 306. Since the PHP-FPM instance 312 is already active, the connection may be established successfully, and the web server 304 may forward, at 358, the request directly to the PHP-FPM instance 312. The PHP-FPM instance 312 may process the request and respond, at 360, to the web server 304, which transmits the PHP response back, at 362, to the HTTP client 352.

At 364, the KRAC controller 310 may continually monitor the PHP-FPM instance 312 for activity indicators, which may include heartbeat signals, request processing status, CPU utilization, active network connections, or other process activity metrics. When the KRAC controller 310 determines that an idle timeout period has expired without detecting activity from the PHP-FPM instance 312, the KRAC controller 310 may terminate the process, at 366, to release allocated memory resources. This termination may occur after a predetermined idle period, thereby optimizing system efficiency by ensuring that inactive processes do not consume system resources unnecessarily in high-density shared hosting deployments.

FIG. 4 illustrates another view of a complete operational flow 400 of the KRAC system, showing the detailed sequence of interactions from initial HTTP request through process termination. The diagram includes an HTTP client 402, a web server 404, a per-site socket 406, a Linux kernel 408, an eBPF-aware controller 410, and a PHP-FPM site pool 412. The HTTP client 402, web server 404, per-site socket 406, Linux kernel 408, eBPF-aware controller 410, and PHP-FPM site pool 412 may be or may be implementations of corresponding components described in FIGS. 2A, 2B, 3A, and 3B.

The operational sequence begins when the HTTP client 402 transmits an HTTP request 414 to the web server 404. The web server 404 may initiate a FastCGI connect with retries 416 to the per-site socket 406, which generates a connect( ) event 418 detected by the Linux kernel 408. A KRAC kernel-level monitor (not shown in FIG. 4) executing within the Linux kernel 408 may capture the connect( ) event and transmit (e.g., log, register, etc.) the event data to a data structure (e.g., a kernel ring buffer, a first-in-first-out queue, a linked list, etc.). The eBPF-aware controller 410 may poll the data structure for connect( ) events 420 and, upon detecting an access attempt without an active process, may spawn a PHP-FPM process 422 if not running. Once the PHP-FPM site pool 412 becomes ready to accept FastCGI connections 424, the web server 404 may forward the request for processing 426 to the PHP-FPM site pool 412.

During operation, the eBPF-aware controller 410 may monitor activity heartbeat signals 428 from the PHP-FPM site pool 412 to track request processing activity. When the eBPF-aware controller 410 determines that an idle timeout period has expired without detecting activity, the eBPF-aware controller 410 may terminate the process on idle timeout 430, thereby releasing allocated system resources. This comprehensive flow demonstrates the complete lifecycle of on-demand process activation, from initial request detection through dynamic spawning, active processing, monitoring, and eventual termination to optimize resource utilization in high-density hosting environments.

Figure 6:
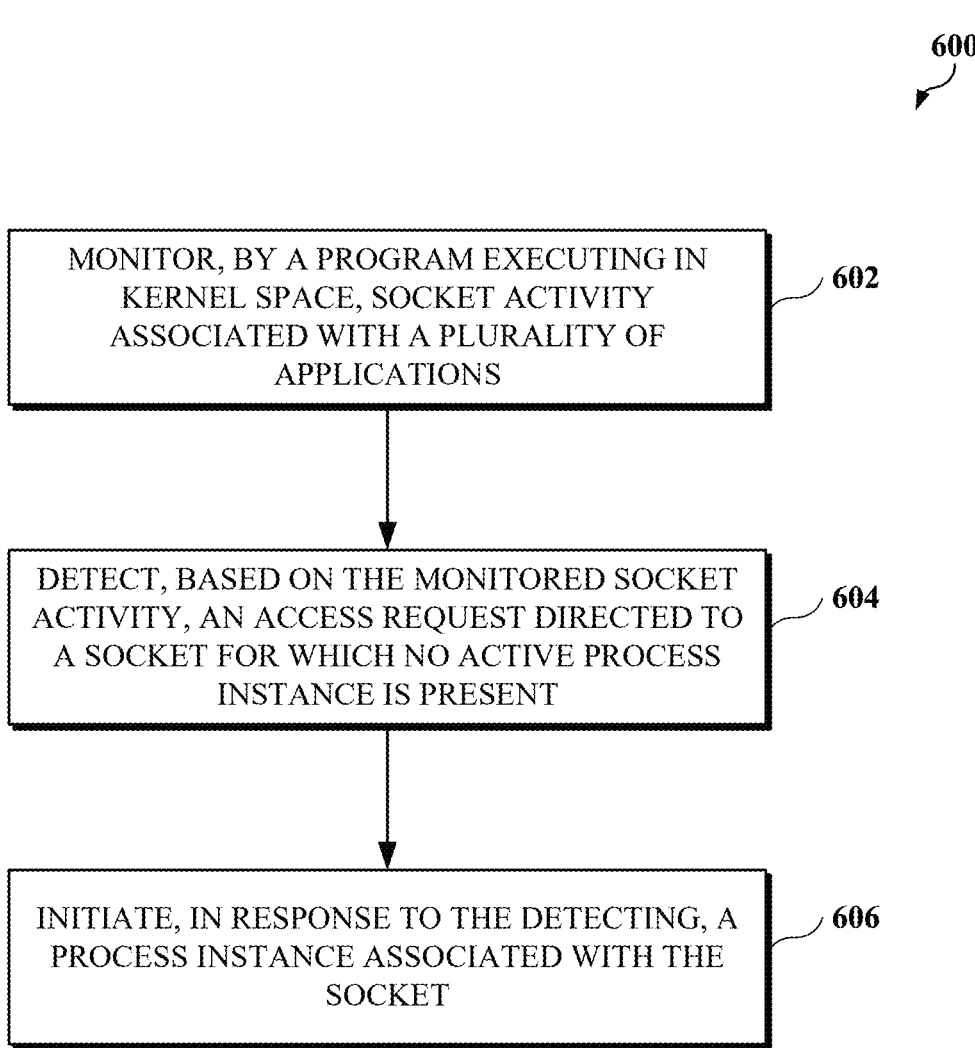
FIG. 6 is a flow diagram of a technique for socket-based process management according to some implementations of the disclosed subject matter.

To further describe some implementations in greater detail, reference is next made to examples of techniques which may be performed by or using kernel-level resource activation for process management described herein. FIG. 5 is a flow diagram of a technique 500 for kernel-level resource activation for process management. FIG. 6 is a flow diagram of a technique 600 for socket-based process management according to some implementations of the disclosed subject matter. The techniques 500 and 600 may be implemented in whole or in part using the components and systems described in previous figures, including KRAC controller daemons and kernel-level monitoring programs. The techniques 500 and 600 may facilitate dynamic process instance management based on operating system resource (e.g., socket) activity monitoring, thereby optimizing resource utilization in multi-application environments.

The techniques 500 and 600 can be executed using computing devices, such as the systems, hardware, and software described with respect to FIGS. 1-4. The techniques 500 and 600 can each be performed, for example, by executing a machine-readable program or other computer-executable instructions, such as routines, instructions, programs, or other code. The steps, or operations, of the techniques 500 and 600, or another technique, method, process, or algorithm described in connection with the implementations disclosed herein can be implemented directly in hardware, firmware, software executed by hardware, circuitry, or a combination thereof.

For simplicity of explanation, the techniques 500 and 600 are each depicted and described herein as a respective series of steps or operations. However, the steps or operations of the techniques 500 and 600 can occur in various orders and/or concurrently. Additionally, other steps or operations not presented and described herein may be used. Furthermore, not all illustrated steps or operations may be required to implement a technique in accordance with the disclosed subject matter.

Referring now to FIG. 5, at 502, the technique 500 may include monitoring, using a program executing in kernel space, system calls associated with access to an operating system resource. The program executing in kernel space may include an Extended Berkeley Packet Filter (eBPF) program that may be attached to kernel hooks to observe system call activities without requiring modification of kernel source code. The monitoring may include hooking into a kernel of an operating system to observe the system calls and may involve attaching an eBPF program to a kernel hook and collecting system call data using an eBPF ring buffer. Hooking into the kernel may refer to intercepting or capturing system calls at specific points in the kernel execution flow, which may be implemented by registering callback functions or program code at predetermined kernel locations where system calls are processed.

The operating system resource may include at least one of a socket, a pipe, or a port, and may be one of a plurality of operating system resources in a multi-tenant environment. The monitoring operation 502 may be implemented using the KRAC kernel-level monitor components described herein, which may be configured to observe system calls such as connect( ) operations that trigger the monitoring mechanism when access attempts are made to operating system resources. In some implementations, the socket may be associated with a website in a shared hosting environment and may include a per-site UNIX socket, with the method further including routing HTTP requests for the website to the per-site UNIX socket.

The technique 500 may include configuring the program to observe the system calls through a ring buffer mechanism. Observing system calls may include capturing and recording system call parameters, return values, and associated metadata when the system calls are invoked. The observation may be implemented by intercepting system call events at the kernel level and extracting relevant information such as process identifiers, resource identifiers, and timing data for analysis by user-space components.

At 504, the technique 500 may include detecting, based on the monitoring, an access attempt to the operating system resource. The detecting may include identifying the system call as corresponding to the operating system resource and determining that no active process is associated with the operating system resource. Detecting the access attempt may include identifying a system call type associated with the access attempt and confirming an absence of an active process using a process status check. The system call type may refer to the specific category or function of the system call being invoked, such as connect( ) read( ) write( ) or open( ) operations, each having distinct parameters and purposes within the operating system.

Identifying the system call type may be implemented by examining system call [0084] numbers, function identifiers, or operation codes that distinguish between different types of kernel requests made by user-space applications.

The technique 500 may include determining that no active process is associated with the operating system resource prior to spawning the process. Detecting the access attempt may involve communicating an occurrence of at least one of the system calls to a controller daemon executing in user space, where the communicating may include using an eBPF ring buffer to transmit data related to the system calls from kernel space to the controller daemon in user space.

The controller daemon may include an eBPF-aware spawner configured to receive connect events from the eBPF ring buffer and may be configured to perform the spawning and terminating of processes. Detecting the access attempt may be performed by the KRAC controller daemon components that receive event notifications from kernel-space monitoring programs through communication channels such as ring buffers.

At 506, the technique 500 may include spawning, in response to the detecting, a process configured to handle access to the operating system resource. The process may include a PHP FastCGI Process Manager (PHP-FPM) process that may be spawned to handle PHP script execution for websites in shared hosting environments. The process may be spawned within an isolated operating system namespace to separate the process from other processes in a computing environment, where the isolated namespace may provide process and resource isolation. The spawning may include initializing a process configuration based on the operating system resource and allocating memory resources for the process within a shared hosting environment.

The technique 500 may include executing the spawned process in response to receiving an incoming connection request and may include queuing subsequent access attempts to the operating system resource during spawning of the process and processing the queued access attempts upon completion of the spawning. The technique 500 may include receiving an HTTP request at a web server and establishing a FastCGI connection from the web server to the PHP-FPM process via the operating system resource, where establishing the FastCGI connection may include implementing connection retries while the PHP-FPM process is being spawned. Spawning the process may be performed on-demand only when access attempts are detected, thereby optimizing memory utilization.

At 508, the technique 500 may include, in some implementations, terminating the process based on an expiration of an idle period. The terminating may include sending a termination signal to the process after the idle period has elapsed without the process handling a new access attempt. Terminating the process may include monitoring the process for activity during the idle period and releasing allocated memory resources upon expiration of the idle period. Terminating the process may include automatically deactivating the process after detecting no activity for the idle period.

Terminating the process may include monitoring the process for activity throughout the idle period to track request processing status, where terminating the process may include destroying a PHP-FPM site pool when no activity is detected for the duration of the predetermined idle period. The monitoring for activity may include observing various process indicators such as CPU utilization, network connections, or request handling status. The termination may be performed by the KRAC controller daemon components and may occur automatically based on predefined idle timeout periods, optimizing memory utilization by releasing resources from inactive processes.

Alternative implementations of kernel-level resource activation may include monitoring, at a kernel level of an operating system using a kernel-level instrumentation tool, for a connection attempt directed to a system resource associated with an inactive application process, detecting the connection attempt, and initiating the inactive application process. Another alternative may include associating a plurality of application instances with corresponding socket identifiers, monitoring for connection events directed to the socket identifiers, identifying that a corresponding application instance is in an inactive state, and transitioning the application instance from inactive to active state.

A further alternative implementation may include attaching a probe to monitor kernel events related to resource access requests, identifying a resource access request targeting a resource lacking a currently running associated process, launching a process to service the resource access request, and shutting down the process upon detection of an idle state persisting for a predetermined duration. These alternative approaches may provide various methods for implementing kernel-level resource activation and process management in different computing environments.

Referring now to FIG. 6, at 602, the technique 600 may include monitoring, by a program executing in kernel space, socket activity associated with a plurality of applications. The program executing in kernel space may include an eBPF program that may be configured to observe socket operations without requiring modification of kernel source code. The monitoring may involve observing connect( ) system calls directed to the plurality of sockets, where each socket may be associated with a specific application or service. The monitoring operation may be implemented using kernel-level instrumentation that captures socket events and related metadata for analysis by system management components.

The socket activity monitoring may include tracking various types of socket operations, including connection attempts, data transfers, and socket state changes across multiple applications simultaneously. The monitoring may be performed continually, periodically, or in response to specific trigger events to detect access patterns and usage levels for different sockets. The technique 600 may include communicating socket activity data from the kernel space program to a user space controller daemon via a ring buffer mechanism, facilitating efficient data transmission between kernel and user space components. The monitoring operation may capture socket identifiers, process information, and timing data to support subsequent decision-making processes.

At 604, the technique 600 may include detecting, based on the monitored socket activity, an access request directed to a socket for which no active process instance is present. Detecting the access request may include identifying the socket as corresponding to an inactive application and analyzing the nature of the access request to determine appropriate response actions. The access request may include a connection attempt to a specific socket within the plurality of sockets, where the connection attempt triggers evaluation of the current process state. The detection operation may include examining socket metadata, process status information, and system resource availability to confirm the absence of an active process instance.

Detecting the access request may include processing socket activity data received through ring buffer mechanisms and applying filtering logic to identify relevant access attempts that require process activation. The detection may include confirming the absence of an active process using process status checks, system resource queries, or application state monitoring mechanisms. The user space controller daemon may include an eBPF-aware spawner configured to receive socket events from the ring buffer and process these events to determine when process instantiation is needed. The detecting may also include validating that the access request corresponds to a legitimate application requirement rather than spurious or malicious activity.

At 606, the technique 600 may include initiating, in response to the detecting, a process instance associated with the socket. The initiating may include spawning a PHP-FPM process configured to handle requests for the inactive application, thereby providing on-demand process activation based on actual usage patterns. The process instance may be dynamically created in response to the received socket events, with configuration parameters determined based on the specific socket and associated application requirements. The initiating operation may include isolating the process instance within a dedicated operating system namespace and allocating memory resources for the process instance based on configuration parameters associated with the socket.

Initiating the process instance may include initializing application-specific configurations, establishing necessary resource allocations, and preparing the process instance to handle incoming requests through the associated socket. The technique 600 may include setting up communication channels between the newly created process instance and the socket infrastructure to facilitate seamless request handling. Initiating the process instance may be performed by system management components that coordinate between kernel-level monitoring and user-space process management to provide rapid response to application demands while maintaining system efficiency through selective resource allocation.

The technique 600 may support various extensions and enhancements, including terminating the process instance after a predetermined idle period during which no socket activity is detected for the associated socket. This termination capability may provide automatic resource cleanup that maintains system efficiency by releasing unused processes and associated memory allocations. The technique may be implemented across different computing environments, including distributed systems, cloud platforms, and traditional server infrastructures, providing flexible approaches to dynamic process management based on socket activity patterns.

Unless expressly stated, or otherwise clear from context, the terminology "computer," and variations or wordforms thereof, such as "computing device," "computing machine," "computing and communications device," and "computing unit," indicates a "computing device," such as the computing device 100 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective implementations.

The figures, drawings, diagrams, illustrations, and charts shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "implementation" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or implementations may be limited to the expressly recited or described aspects or elements, and some implementations or implementations may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
monitoring, using a program executing in kernel space, system calls associated with access to an operating system resource;
detecting, based on monitoring the system calls, an access attempt to the operating system resource;
spawning, in response to detecting the access attempt, a process configured to handle the access to the operating system resource, wherein the process configured to handle the access to the operating system resource comprises a PHP FastCGI Process Manager (PHP-FPM) process;
monitoring activity heartbeat signals from the PHP-FPM process to track request processing activity; and
terminating the PHP-FPM process by destroying a PHP-FPM site pool when no heartbeat activity is detected for an idle period.

2. The method of claim 1, wherein the program executing in the kernel space comprises an Extended Berkeley Packet Filter (eBPF) program.

3. The method of claim 1, wherein the operating system resource comprises a socket and the system calls associated with the access to the socket comprises a connect( ) system call.

4. The method of claim 3, wherein the socket is associated with a website in a shared hosting environment.

5. The method of claim 1, wherein spawning the process comprises:
spawning the process within an isolated operating system namespace to separate the process from other processes in a computing environment.

6. The method of claim 1, wherein detecting the access attempt comprises:
identifying one of the system calls as corresponding to the operating system resource; and
determining that no active process is associated with the operating system resource.

7. The method of claim 1, further comprising:
implementing connection retries while the PHP-FPM process is being spawned.

8. The method of claim 1, wherein monitoring the system calls comprises:
attaching an Extended Berkeley Packet Filter (eBPF) program to a kernel hook; and
collecting system call data using an eBPF ring buffer.

9. A device, comprising:
a memory subsystem; and
processing circuitry, the processing circuitry configured to execute instructions stored in the memory subsystem to:
monitor, using a program executing in kernel space, system calls associated with access to an operating system resource;
detect, based on monitoring the system calls, an access attempt to the operating system resource;
spawn, in response to detecting the access attempt, a process configured to handle the access to the operating system resource, wherein the process configured to handle the access to the operating system resource comprises a PHP FastCGI Process Manager (PHP-FPM) process;
monitor activity heartbeat signals from the PHP-FPM process to track request processing activity; and
terminate the PHP-FPM process by destroying a PHP-FPM site pool when no heartbeat activity is detected for an idle period.

10. The device of claim 9, wherein, to monitor the system calls, the processing circuitry is further configured to execute instructions stored in the memory subsystem to:
hook into a kernel of an operating system to observe the system calls; and
communicate an occurrence of at least one of the system calls to a controller daemon executing in user space.

11. The device of claim 10, wherein the processing circuitry is further configured to execute instructions stored in the memory subsystem such that the controller daemon comprises an Extended Berkeley Packet Filter (eBPF) spawner configured to receive connect events from an eBPF ring buffer and dynamically spawn the PHP-FPM site pools in response to the connect events, wherein the eBPF ring buffer is used to transmit data related to the at least one of the system calls from the kernel space to the controller daemon in the user space.

12. The device of claim 9, wherein, to detect the access attempt, the processing circuitry is further configured to execute instructions stored in the memory subsystem to:
identify one of the system calls as corresponding to the operating system resource; and
determine that no active process is associated with the operating system resource.

13. The device of claim 9, wherein the operating system resource is one of a plurality of operating system resources, and wherein the processing circuitry is configured to execute the instructions stored in the memory subsystem for each of the plurality of operating system resources in a multi-tenant environment.

14. The device of claim 9, wherein, to monitor the system calls, the processing circuitry is further configured to execute instructions stored in the memory subsystem to:

attach an Extended Berkeley Packet Filter (eBPF) program to a kernel hook; and collect system call data using an eBPF ring buffer.

15. The device of claim 9, wherein, to spawn the process, the processing circuitry is further configured to execute instructions stored in the memory subsystem to:

initialize a process configuration based on the operating system resource; and allocate memory resources for the process within a shared hosting environment.

16. One or more non-transitory computer-readable storage media comprising instructions that, when executed by one or more processors, perform operations for process management, the operations comprising:

monitoring, using a program executing in kernel space, system calls associated with access to an operating system resource;

detecting, based on monitoring the system calls, an access attempt to the operating system resource;

spawning, in response to detecting the access attempt, a process configured to handle the access to the operating system resource, wherein the process configured to handle the access to the operating system resource comprises a PHP FastCGI Process Manager (PHP-FPM) process;

monitoring activity heartbeat signals from the PHP-FPM process to track request processing activity; and terminating the PHP-FPM process by destroying a PHP-FPM site pool when no heartbeat activity is detected for an idle period.

17. The one or more non-transitory computer-readable storage media of claim 16, the operations further comprising:

queuing subsequent access attempts to the operating system resource during spawning of the process; and processing the queued access attempts upon completion of the spawning.

18. The one or more non-transitory computer-readable storage media of claim 16, the operations further comprising:

receiving an HTTP request at a web server; and establishing a FastCGI connection from the web server to a PHP FastCGI Process Manager (PHP-FPM) process via the operating system resource.

19. The one or more non-transitory computer-readable storage media of claim 18, wherein establishing the FastCGI connection comprises:

implementing connection retries while the PHP-FPM process is being spawned.

20. The one or more non-transitory computer-readable storage media of claim 16, wherein detecting the access attempt comprises:

identifying one of the system calls as corresponding to the operating system resource; and determining that no active process is associated with the operating system resource.

*     *     *     *     *